(12) United States Patent
Appelberg

(10) Patent No.: US 8,300,432 B2
(45) Date of Patent: Oct. 30, 2012

(54) POWER CONVERTER UTILIZING A RC CIRCUIT TO CONDUCT DURING THE RISING EDGE OF THE TRANSFORMER VOLTAGE

(75) Inventor: Mikael Appelberg, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 210 days.

(21) Appl. No.: 12/997,022

(22) PCT Filed: Jun. 17, 2008

(86) PCT No.: PCT/SE2008/050723
§ 371 (c)(1),
(2), (4) Date: Dec. 9, 2010

(87) PCT Pub. No.: WO2009/154523
PCT Pub. Date: Dec. 23, 2009

(65) Prior Publication Data
US 2011/0090724 A1   Apr. 21, 2011

(51) Int. Cl.
*H02M 3/335* (2006.01)
*H02M 5/42* (2006.01)

(52) U.S. Cl. ............... 363/21.14; 363/21.04; 363/21.06; 363/21.09; 363/21.12; 363/21.17; 363/95; 363/97; 363/131

(58) Field of Classification Search .............. 363/21.04, 363/21.06, 21.09, 21.12, 21.14, 21.17, 95, 363/97, 131
See application file for complete search history.

(56) References Cited

U.S. PATENT DOCUMENTS

| | | | | |
|---|---|---|---|---|
| 5,663,877 | A * | 9/1997 | Dittli et al. | 363/127 |
| 5,708,571 | A * | 1/1998 | Shinada | 363/16 |
| 5,734,563 | A * | 3/1998 | Shinada | 363/21.06 |
| 6,091,616 | A * | 7/2000 | Jacobs et al. | 363/127 |
| 6,104,623 | A * | 8/2000 | Rozman | 363/21.06 |
| 6,243,278 | B1 * | 6/2001 | Jacobs | 363/127 |
| 6,288,920 | B1 * | 9/2001 | Jacobs et al. | 363/127 |
| 6,377,477 | B1 * | 4/2002 | Xie et al. | 363/21.14 |
| 6,452,818 | B1 * | 9/2002 | Simopoulos | 363/21.06 |
| RE37,889 | E * | 10/2002 | Rozman | 363/21.06 |
| 6,563,719 | B1 * | 5/2003 | Hua et al. | 363/21.06 |
| 6,674,658 | B2 * | 1/2004 | Mao et al. | 363/127 |
| 6,831,847 | B2 * | 12/2004 | Perry | 363/21.06 |
| 6,987,679 | B2 * | 1/2006 | Gan et al. | 363/89 |
| 7,035,120 | B2 * | 4/2006 | Tobita | 363/21.06 |
| 7,751,213 | B2 * | 7/2010 | Toccaceli | 363/127 |
| 2010/0182807 | A1 * | 7/2010 | Miyamoto et al. | 363/21.14 |

* cited by examiner

*Primary Examiner* — Bao Q Vu

(57) ABSTRACT

An isolated power converter comprising a transformer arranged in such a way that the mirrored primary voltage on the secondary side has a positive potential relative to ground, said converter comprising a derivating net arranged to cause the second transistor to conduct in dependence of the voltage across the secondary winding, the source of the second transistor being connected to the negative end of the secondary winding, the drain of a third transistor further being connected to the positive end of the secondary winding, a second capacitor and a second resistor being connected between the gate and the source of the third transistor, a third resistor connected between the second resistor and the drain of the second transistor, a third capacitor connected between the sources of the second and third transistors to provide a first output voltage on one terminal of the third capacitor and a second output voltage on the other terminal of the third capacitor.

9 Claims, 6 Drawing Sheets

Prior art

POWER CONVERTER UTILIZING A RC CIRCUIT TO CONDUCT DURING THE RISING EDGE OF THE TRANSFORMER VOLTAGE

TECHNICAL FIELD

The present invention relates to a power converter, and in particular to a power converter having a control circuit arranged on its secondary side.

BACKGROUND AND RELATED ART

The increasing dynamic requirements, such as monotonic start-up, recovery after short-circuit, load transient performance, has let to the re-partitioning of the control structure for many modern insulated power converters. Previously the normal way of structuring the design was to place the control circuit on the primary side and only transmit an error signal from a voltage control system on the secondary side. The most efficient way to meet the requirements mentioned above is to place the control-circuit on the secondary side, where the output voltage can be monitored more efficiently. The introduction of digital control and a digital interface placed on the secondary side will make it even more logical to use this secondary side control.

One problem with this secondary side control is that the control circuit, now placed on the secondary side, has to be biased from the primary side. To achieve this, the input voltage has to be monitored both accurately, since monitoring capabilities of the input voltage is often a requirement in digital controllers and the signal is used in the control of the main converter. The input voltage must also be monitored with a high dynamic bandwidth, for the converter to be able to handle input voltage transients (voltage mode feed-forward).

The control circuit is often biased from a small auxiliary converter, also called a bias regulator, often a flyback type, which bias both the control circuit and synchronous mosfets and the primary switching mosfets.

One method to generate a signal corresponding to the input voltage is to derive it from the bias supply by peak rectifying the forward pulse in the auxiliary converter, or the actual power train, and storing this information in a capacitor. If the primary voltage increases, the capacitor is charged on a cycle to cycle basis and will accurately mirror the primary voltage. If the primary voltage decreases there is no discharge path that discharges the capacitor to the transformed voltage. The capacitor is therefore discharged via a resistor or a current source and the correct voltage is achieved by the charging of the capacitor every cycle. This causes a trade-off between high dynamic performance, which causes a high ripple due to a large discharge off the capacitor every cycle, and accuracy, which requires the capacitor to be discharged only slightly for every cycle.

The drawback of the solution using peak rectification above is that it is hard to match the requirement for high dynamic performance with high accuracy. The solution will always be able to have a high dynamic bandwidth when the input voltage increases but the bandwidth will be limited by the maximum acceptable voltage ripple on the secondary voltage, since the depletion of the capacitor between switching cycles will represent itself as a ripple on the mirrored voltage. The forward voltage drop of the rectifying device will also affect the accuracy of the measured voltage.

Another more costly method is to use linear optocouplers. The input voltage signal is measured by an operational amplifier and converted to a current, which is used to drive a linear optocoupler. This current is then converted to a voltage on the secondary side. One drawback with the optocoupler approach is that one extra component crossing the insulation barrier is required. Also, such a solution is relatively expensive and will also have problem with ageing.

SUMMARY

It is an object of the present invention to provide a power converter as defined above having a more accurate indication of the input voltage to the primary side for input to the control circuit.

The invention relates to an isolated power converter comprising a transformer having a primary side comprising a primary winding to which a primary voltage is applied and a secondary side comprising a secondary winding arranged to mirror the primary voltage and provide an output voltage, and an insulation barrier between the primary side and the secondary side, and arranged in such a way that the mirrored primary voltage on the secondary side has a positive potential relative to ground. The converter comprises a derivating net arranged to cause the second transistor to conduct in dependence of the voltage across the secondary winding, the source of the second transistor being connected to the negative end of the secondary winding, the drain of a third transistor further being connected to the positive end of the secondary winding, a second capacitor and a second resistor being connected between the gate and the source of the third transistor, a third resistor connected between the second resistor and the drain of the second transistor, a third capacitor arranged to provide reference voltage on one of its terminals.

Preferably, the derivating net is arranged to cause the second transistor to conduct during the rising edge of the transformer voltage.

The concept of the invention is a solution much like the peak rectification scheme described above, but with the addition that the information storage device, the capacitor, can be both charged and discharged every switching cycle. This is achieved by enabling the discharge of the capacitor through a device, such as a MOSFET, that is capable of bidirectional energy transfer. This drastically reduces ripple on the mirrored voltage and also increases the dynamic performance when the storage device is to be discharged.

The main advantages with the invention are that it creates a highly accurate, both statically and dynamically mirrored signal of the primary voltage using an existing system and only a few low cost components.

The solution requires no components, except the already existing transformer, crossing the insulation barrier, which can be a major benefit in high density solutions. If accurately chosen the components C1, R1 will work as a snubber for the transformer voltage, thus integrating that function in the system.

The rectifying element is preferably a diode connected by its cathode to the positive end of the secondary winding.

In one embodiment the derivating net comprises a first capacitor connected between the positive end of the secondary winding and the gate of the second transistor and a first resistor connected between the gate of the second transistor and the negative end of the secondary winding.

The converter preferably comprises offset compensating circuitry for removing an offset of the second voltage output. The offset compensating circuitry in one embodiment comprises a first bipolar transistor, the base of the fourth transistor being connected to the first output voltage, the emitter of the fourth transistor being connected to the second output voltage through a fourth resistor and the collector of the fourth transistor being connected to ground through a fifth resistor, a reference ground level being provided on the collector of the fourth transistor. This is a simple inexpensive solution; however, it introduces an error, which means that it may not be sufficiently exact in all fields of applications.

Alternatively, the offset compensation circuitry comprises a differential amplifier, the non-inverting input of the differential amplifier connected through a sixth resistor to the second voltage output and through a seventh resistor to ground, the inverting input of the differential amplifier connected to the first voltage output through a ninth resistor and an eighth resistor being connected from the inverting input to the output of the differential amplifier, the output of the differential amplifier providing the reference ground voltage. This is a more complex solution than the above, but provides an exact reference ground voltage.

A Zener diode may be arranged between the gate and the source of the second and/or the third transistor to limit the voltage across the respective transistor. This will increase the input voltage range that can be handled by the respective transistor and therefore by the converter.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
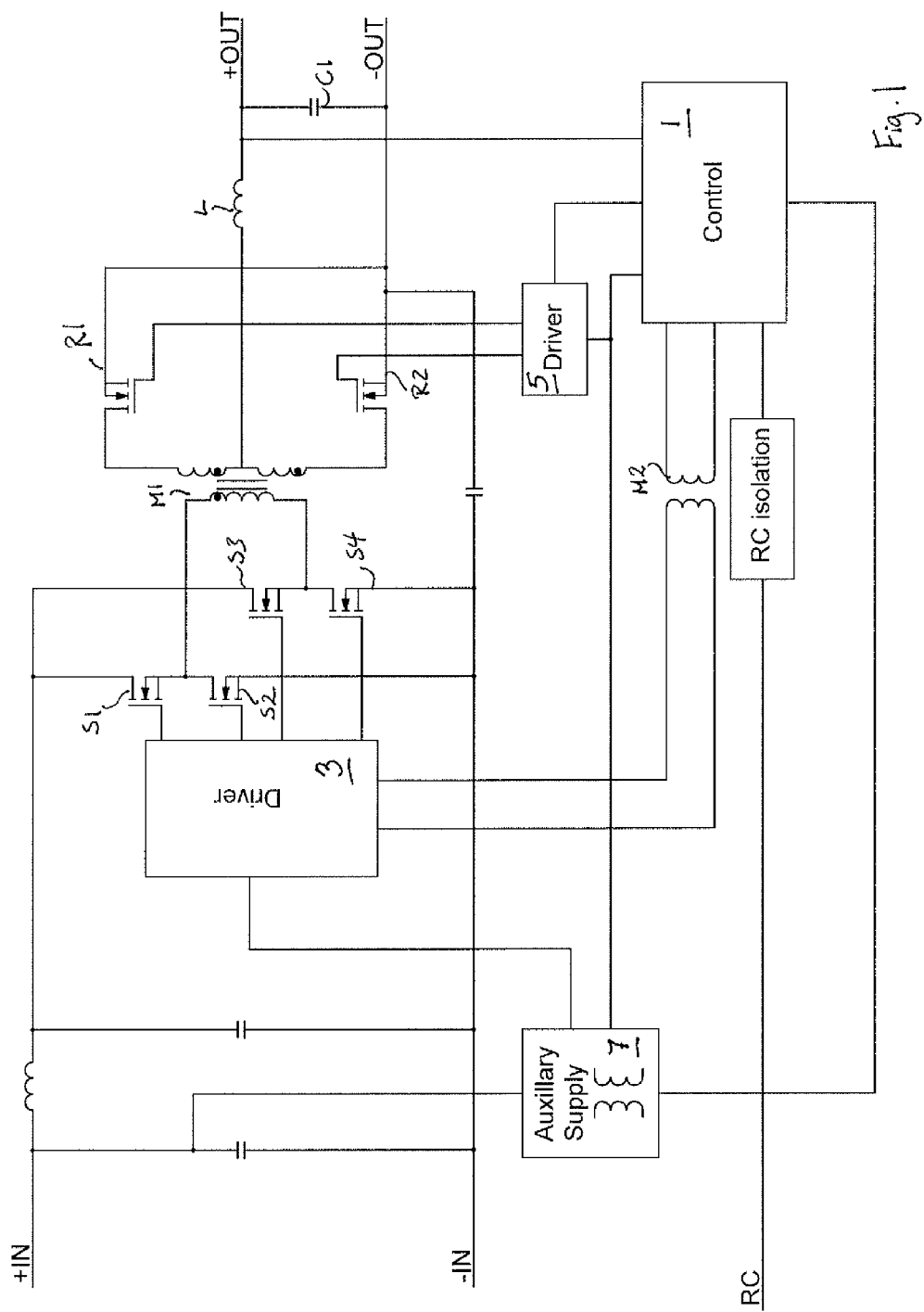
FIG. 1 illustrates a power converter controlled by a control circuit on the secondary side.

FIG. 1 illustrates a power converter controlled by a control circuit on the secondary side. The power converter comprises a main transformer M1 controlled by a number of switch elements S1, S2, S3, S4 on the primary side. The switch elements are controlled by a primary side driver unit 3. On the secondary side two rectifying elements R1, R2 are connected to opposite ends of the secondary winding. The rectifying elements R1, R2 are controlled by a secondary side driver unit 5. The output voltage is extracted between a centre tap of the secondary winding and one of the rectification elements using an inductor L1 and a capacitor C1 in a way common in the art.

The control unit 1 is connected to the primary side driver unit through a second transformer M2 and to the secondary side driver unit 5. The control unit 1 is also connected on the output from the secondary side, between the inductor L1 and the capacitor C1.

An auxiliary converter 7 is provided to bias the control circuit 1. The auxiliary converter 7 is connected to the primary side driver unit 3, the secondary side driver unit 5 and to the control unit 1. The invention relates to embodiments of this auxiliary converter 7, which will be discussed in the following.

Figure 2A:
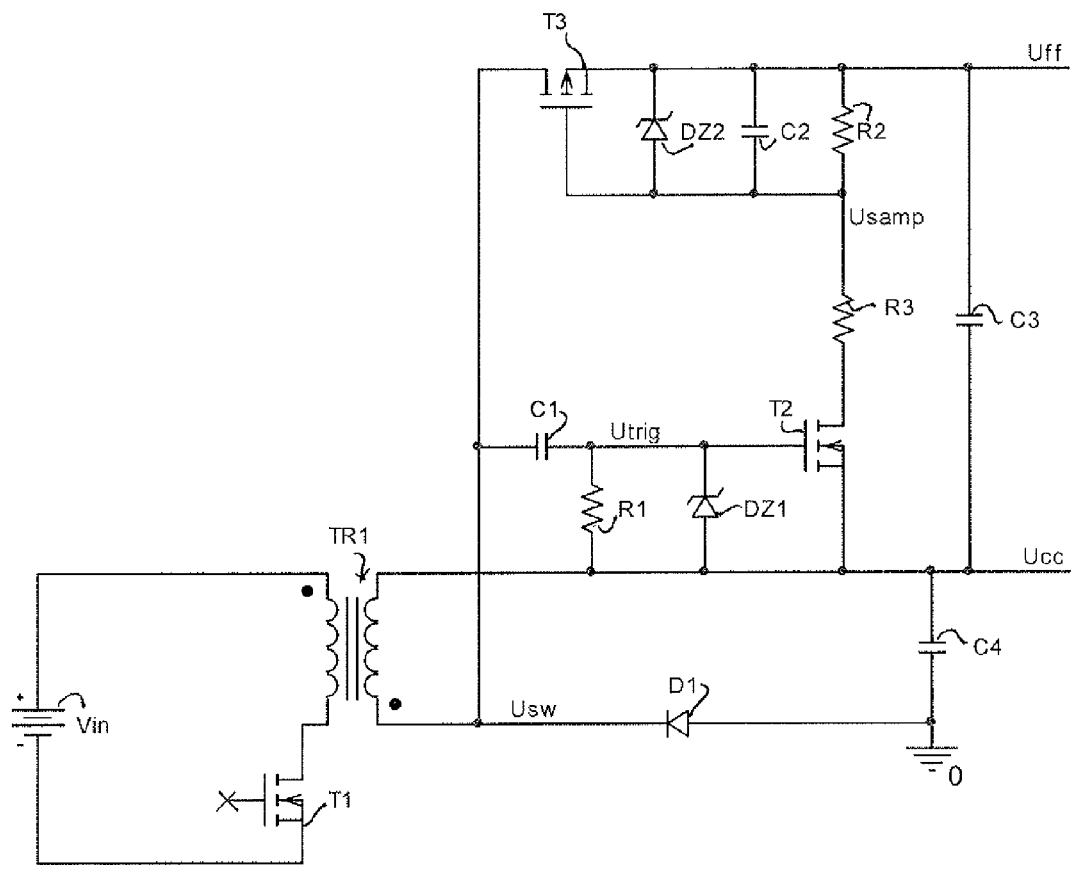
FIGS. 2a and 2b show two different power converters comprising input voltage monitoring circuitry according to a first and a second embodiment of the present invention.

FIG. 2a is a circuit diagram of a power converter comprising input voltage monitoring circuitry according to an embodiment of the present invention. FIG. 2a illustrates a flyback converter but the concept can be used in any converter where the actual input voltage is transformed linearly across the insulation barrier.

As is common in the art the power converter comprises a transformer TR1 having a primary side with a primary winding and a secondary side with a secondary winding, with an insulation barrier between them.

A voltage source Vin is arranged to provide an input voltage to the primary winding. A switch element in the form of a MOSFET T1 is arranged between the voltage source and one end of the primary winding, to control the function of the transformer. The transformer TR1 transforms the flyback energy to the secondary side. On the secondary side, as is common in the art, a rectification element in the form of a diode D1 is arranged between the negative of the secondary winding and ground. An output voltage capacitor C4 is connected between the other end of the secondary winding and ground to store the flyback energy. Observe the placement in the negative branch of the rectification element (diode) D1.

When the mosfet T1 is switched on, the entire input voltage Vin is applied across the primary winding, and subsequently transformed to the secondary side with the ratio N2/N1.

As in FIG. 2a, the input voltage is to be sampled and monitored on the secondary other side of the insulation barrier. To this end, according to this embodiment of the invention, a number of components are arranged on the secondary side.

One end of a first capacitor C1 is connected to the positive end of the secondary winding. A first resistor R1 is connected between the other end of the first capacitor C1 and the negative end of the secondary winding, so that the first capacitor C1 and the first resistor R1 together form a derivating net. Between the first capacitor C1 and the first resistor R1 the gate of a second transistor T2 is connected. The source of the second transistor T2 is connected to the negative end of the secondary winding. Between the gate and the source of the second transistor a first Zener diode DZ1 is connected.

On the positive end of the secondary winding the drain of a third transistor T3 is connected. Between the gate and the source of the third transistor T3 a second Zener diode DZ2 is connected. The function of the Zener diodes DZ1 and DZ2 will be discussed below. A second capacitor C2 is connected between the gate and the source of the third transistor T3. The second capacitor is provided to prevent false turn-on during the falling edge of the transformer voltage. In parallel with the second capacitor a second resistor R2 is connected. A third resistor R3 is connected between the second resistor R2 and the drain of the second transistor T2. In parallel with the connection from the source of the second transistor T2 through the third R3 and second R2 resistors, a third capacitor C3 is connected. Hence, one terminal of the third capacitor C3 will be connected to the positive terminal of the output voltage capacitor C4. At these interconnected terminals an output voltage Ucc will be provided. At the other terminal of the third capacitor C3 a reference voltage Uff for the control circuit will be provided.

The function of the components added according to the invention will be described in the following:

When the switch transistor T1 is conducting, the derivating net comprising the first capacitor C1 and the first resistor R1 will sense the rising edge of the transformer voltage and cause the second transistor T2 to conduct for a time depending on the time constant R1*(C1+CissT2) and on the voltage level of the transformed voltage. The voltage level on the gate of the second transistor T2 will depend on the ratio between a transistor capacitance CissT2 and the first capacitance C1, Ciss being the sum of the capacitance CGS between the gate and source of the second transistor and the capacitance CDG between the drain and the gate of the second transistor.

The second transistor T2 will then pull down the node between the third resistor R3 and the second transistor T2 to the output voltage Ucc and subsequently charge the gate of the third transistor T3 to the voltage level (Uff−Ucc)/(1+R3/R2). The charge time depends mainly on the time constant of (R2//R3)*(C2+CissT3) and the discharge time on R2*(C2+CissT3).

The third transistor T3 will then conduct for a period as will be discussed in the following. During this time the third capacitor C3 will be charged to the voltage over the transformer.

The Zener diodes DZ1 and DZ2 are optional but useful if the input voltage has a wide range. In this case, the voltage over the gates of the second transistor T2 and/or the third transistor T3 can be limited by placing a Zener diode between the gate and source of each respective device. This will enable the respective transistor T2, T3 to handle higher input voltages to the transformer TR1. Using standard devices the system can handle input voltages varying with a factor two.

Figure 3:
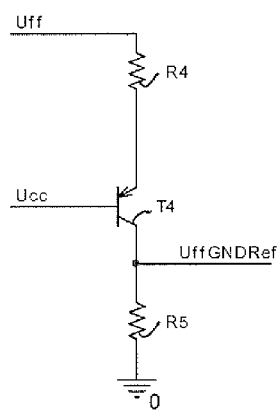
FIG. 3 shows a current generator that may be used to compensate for an offset output voltage.
Figure 4:
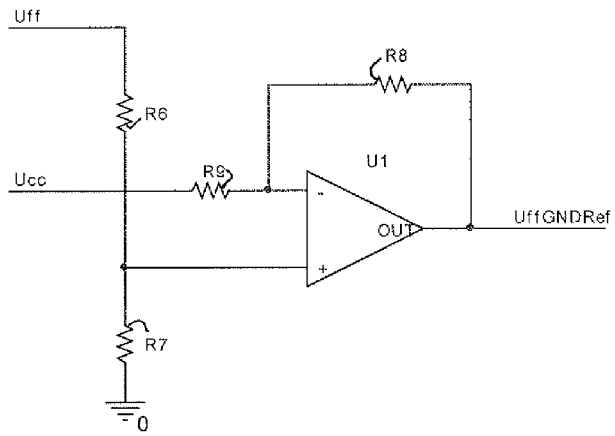
FIG. 4 shows how a differential amplifier may be used to compensate for the offset output voltage.

The voltage over the third capacitor C3 will correspond to Vin*N2/N1. The reference voltage node Uff will have an offset of Ucc compared to GND. This offset can be removed using a current generator as shown in FIG. 3 or a differential amplifier as shown in FIG. 4, to be connected to the output voltages of FIG. 2a as will be discussed in more detail in the following.

Figure 2B:
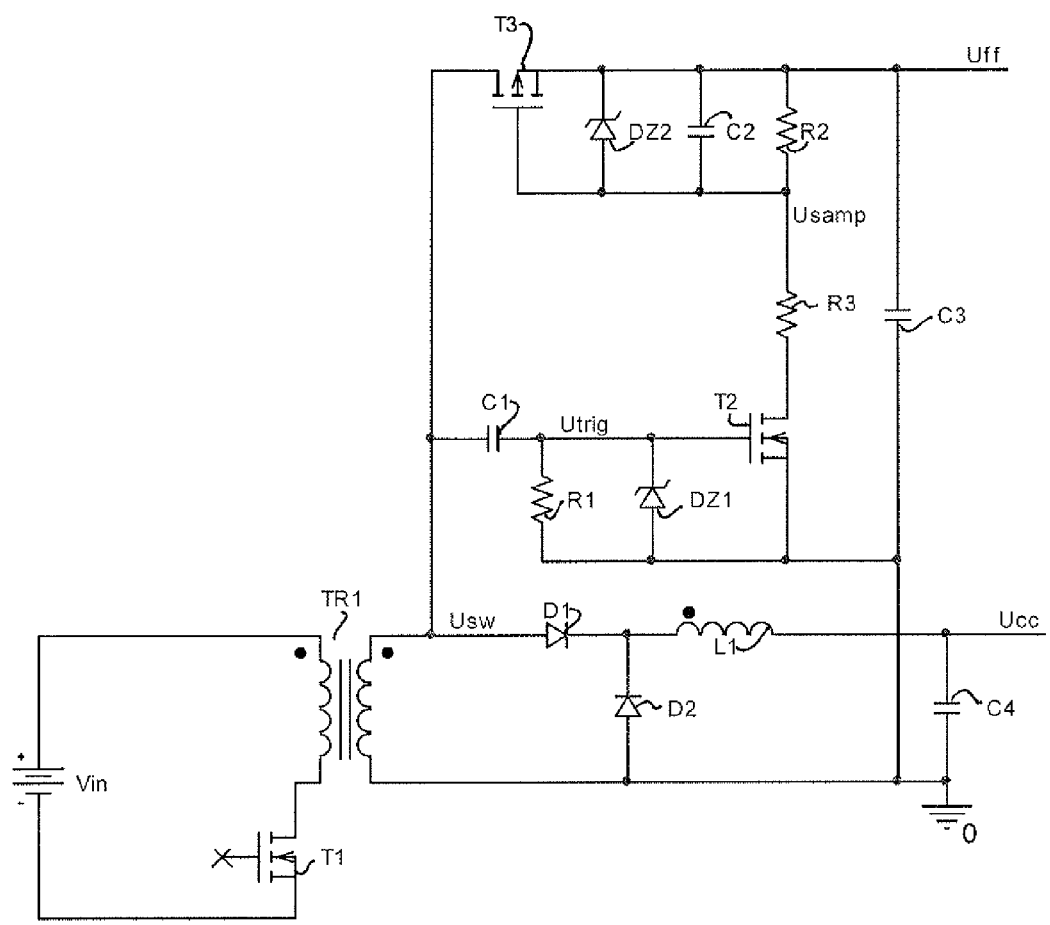

FIG. 2b is a circuit diagram of a power converter comprising input voltage monitoring circuitry according to another embodiment of the present invention. FIG. 2b illustrates a forward converter.

As is common in the art the power converter comprises a transformer TR1 having a primary side with a primary winding and a secondary side with a secondary winding, with an insulation barrier between the sides.

A voltage source Vin is arranged to provide an input voltage to the primary winding. A switch element in the form of a MOSFET T1 is arranged between the voltage source and one end of the primary winding, to control the function of the transformer. The transformer TR1 transforms the energy to the secondary side.

On the secondary side, as is common in the art, a first diode D1 is connected by its anode to one end of the secondary winding. A second diode D2 is connected by its anode to the other end of the secondary winding and to ground. The cathodes of the diodes D1, D2 are interconnected. Between the interconnected cathodes and ground a first inductor L1 and an output capacitor C4 are connected. The output voltage Ucc is obtained across the output capacitor C4.

When the mosfet T1 is switched on, the entire input voltage Vin is applied across the primary winding, and subsequently transformed to the secondary side.

The input voltage is to be sampled and monitored on the secondary other side of the insulation barrier. To this end, according to this embodiment of the invention, a number of components are arranged on the secondary side.

One end of a first capacitor C1 is connected between the anode of the first diode D1 and the end of the secondary winding. The other end of the first capacitor C1 is connected to the gate of a second transistor T2. A first resistor R1 is connected between the emitter and the gate of the second transistor T2, and a first Zener diode DZ1 is preferably connected in parallel with the first resistor R1, with its cathode connected to the gate of the transistor T2.

Between the anode of the first diode D1 and the end of the secondary winding, the source of a third transistor T3 is also connected. A second resistor R2 and a second capacitor C2 are connected in parallel between the gate and the emitter of the third transistor T3. A second Zener diode DZ2 is preferably connected by its anode to the gate and by its cathode to the emitter of the third transistor, in parallel with the second resistor R2 and the second capacitor C2.

The gate of the third transistor T3, as well as the anode of the diode and one end of each of the second capacitor C2 and the second resistor R2, is connected to the drain of the second transistor T2 through a third resistor R3.

A third capacitor C3 is connected between ground and the point connecting the emitter of the third transistor T3, the cathode of the second Zener diode and the other ends of the second capacitor C2 and the second resistor R2. The reference voltage Uff relative to ground is obtained across the third capacitor C3.

In FIG. 3 the base of a first bipolar transistor is connected to the first output voltage Ucc. A fourth resistor R4 is connected between the emitter of the fourth transistor and the second output voltage Uff. A fifth resistor R5 is connected between the collector of the fourth transistor T4 and ground. The reference ground voltage UffGNDRef is obtained on the collector of the first bipolar transistor T4. The first bipolar transistor serves as a current generator controlled by the reference voltage Uff. This is a simple solution but may not be sufficiently exact for all implementations. This device can also be used to filter the signal by placing a capacitor over the resistors R5.

FIG. 4 illustrates how a differential amplifier U1 can be applied to remove the offset to the second voltage output Uff. The non-inverting input of the differential amplifier U1 is connected through a sixth resistor R6 to the second voltage output Uff and through a seventh resistor R7 to ground. The inverting input of the differential amplifier is connected to the first voltage output Ucc through a ninth resistor R9. An eighth resistor R8 is connected from the inverting input to the output of the differential amplifier U1. The reference ground voltage UffGNDRef is obtained on the output of the differential amplifier U1. This device can also be used to filter the signal by placing capacitors over the resistors R7 and R8.

Although two examples have been discussed above, the skilled person is aware of several other solutions for removing the offset voltage. Any suitable such solution could be applied.

Figure 5:
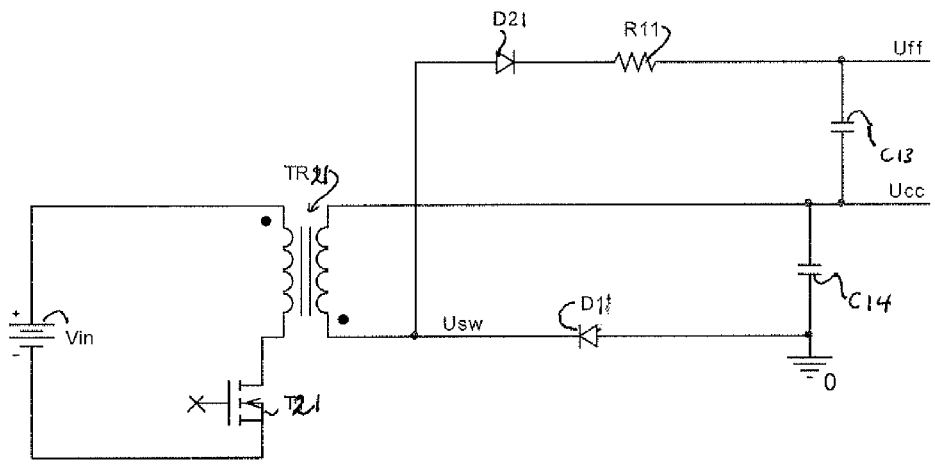
FIG. 5 is a simplified block diagram of a prior art solution.

FIG. 5 is a simplified block diagram of a prior art solution. As in the previous drawings a power converter comprises a transformer TR21 having a primary side with a primary winding and a secondary side with a secondary winding, with an insulation barrier between them. A voltage source Vin is arranged to provide an input voltage to the primary winding. A switch element in the form of a MOSFET T21 is arranged between the voltage source and one end of the primary winding, to control the function of the transformer. As is common in the art, a rectifying element in the form of a diode D11 is connected with its cathode towards the second winding.

In order to sample the input voltage on the secondary side, a number of components have been arranged in connection with the secondary winding. At the positive end of the secondary winding, a second diode D21 is connected with its anode towards the winding. On the cathode a first resistor R11 is serially connected. A first end of a capacitor C13 is connected at the other end of the resistor R11. The second end of the capacitor C13 is connected to the negative end of the secondary winding, that is, to the output voltage Vcc. The reference voltage node Uff is then connected to an offset compensating system, as described above with reference to FIG. 3 and FIG. 4, which is designed to draw a current large enough to deplete the capacitor C3. In the case of a forward converter this is done trough a resistive divider which adjusts the signal level.

Figure 6A:
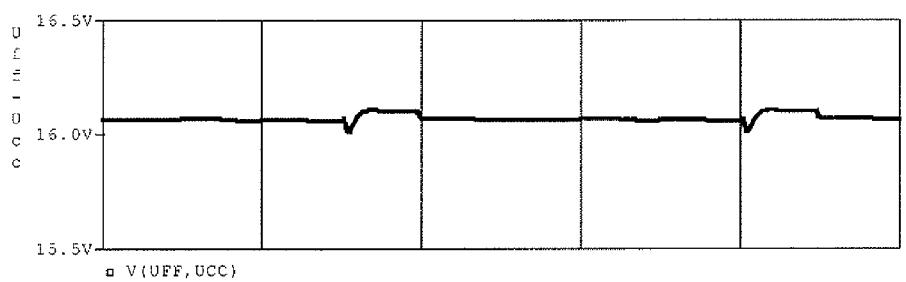
FIGS. 6a-6d illustrate the variation with time of the voltage at four different points on the secondary side.

FIGS. 6a-6d illustrate a simulation of how the voltages in different points of the circuit vary with time. FIG. 6a shows the voltage difference between the reference voltage Uff and the output voltage Ucc, that is, the voltage over the energy storage device C3. The ripple seen is caused by the switching of the transistors T2 and T3 and the charging of C3 from the transformer T1.

Figure 6B:
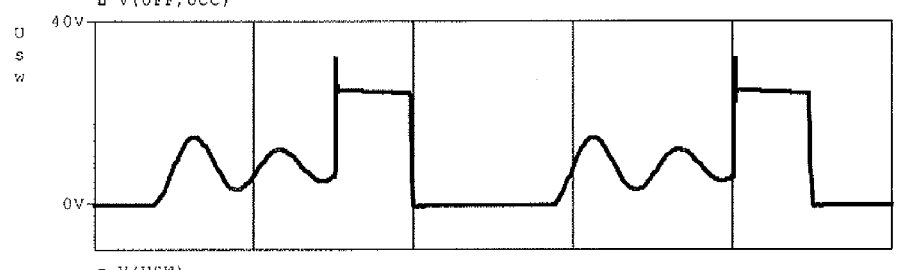

FIG. 6b shows the voltage at the point of connection of the drain of the third transistor to the first diode D1, that is the point denoted Usw in FIGS. 2a and 2b. The figure illustrates the behaviour of a flyback converter. A forward type converter will have a similar appearance but, if arranged as shown in FIG. 2b, an average voltage of zero, that is, there will be no Ucc offset.

Figure 6C:
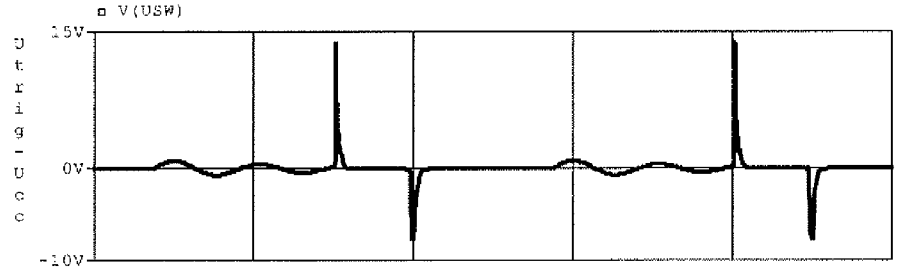

FIG. 6c shows the voltage difference between the gate voltage of the second transistor T2, that is, the point denoted Utrig in FIGS. 2a and 2b, and the output voltage Ucc. This is the signal that causes the second transistor T2 to conduct and charge C2+CissT3.

Figure 6D:
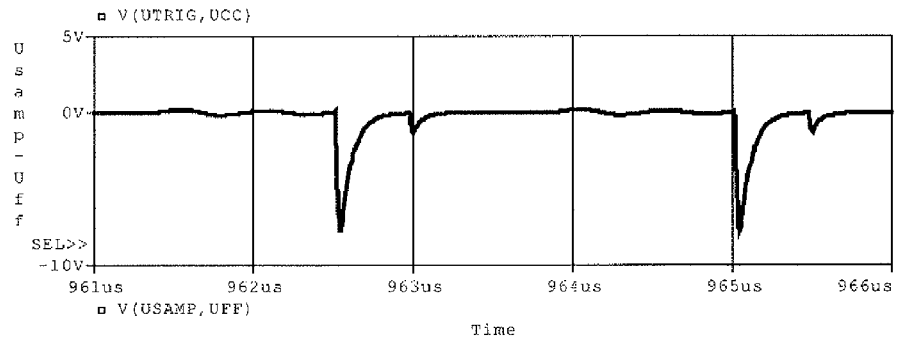

FIG. 6d shows the voltage difference between the gate voltage of the third transistor T3, that is, the point denoted Usamp in FIGS. 2a and 2b, and the reference voltage Uff. This signal indicates when the transistor T3 is conducting. As can be seen there is a slight delay between this signal and the rising edge of the transformer voltage. This is enough to avoid sampling the ringing in the switch node Usw.

Figure 7A:
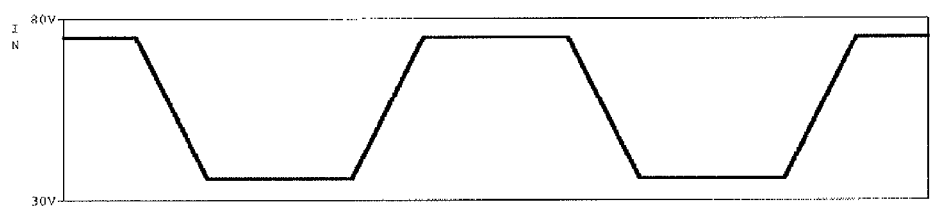
FIGS. 7a-7c illustrate the input voltage, and the voltage over the energy storage device, according to the invention and in a prior art solution, respectively.
Figure 7B:
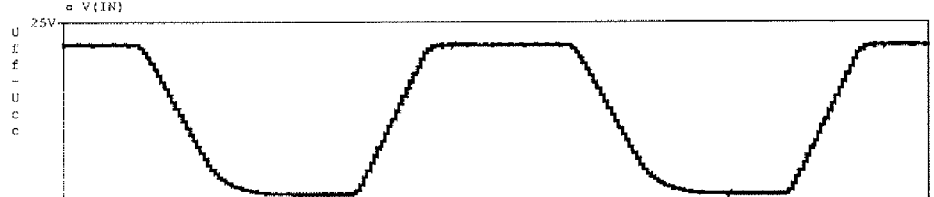
Figure 7C:
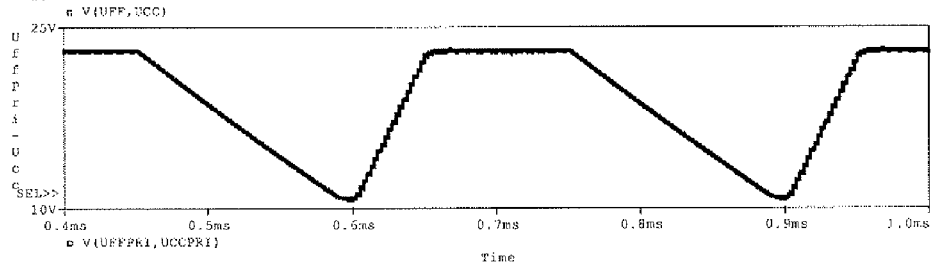

FIG. 7a illustrates the variation of the input voltage Vin to the primary side of the transformer with time. FIG. 7b illustrates the variation of the reference voltage Uff relative to the output voltage Ucc with time using circuitry according to an embodiment of the invention on the secondary side. FIG. 7c illustrates the variation of the reference voltage Uff relative to the output voltage Ucc with time in a prior art system. The prior art system has been dimensioned in such a way that the ripple on the reference voltage node matches the sampler, that is, it has been dimensioned for high accuracy rather than to have a high bandwidth. The same time scale is used in all three Figures. As can be seen, the curve in FIG. 7b reflects the curve in FIG. 7a much better than the curve in FIG. 7c does.

The invention claimed is:

1. An isolated power converter comprising a transformer having a primary side comprising a primary winding to which a primary voltage is applied and a secondary side comprising a secondary winding arranged to mirror the primary voltage and provide an output voltage, and an insulation barrier therebetween, and arranged in such a way that the mirrored primary voltage on the secondary side has a positive potential relative to ground, said converter comprising:

a derivating net arranged to cause the second transistor to conduct in dependence of the voltage across the secondary winding, the source of the second transistor being connected to the negative end of the secondary winding, the drain of a third transistor further being connected to the positive end of the secondary winding, a second capacitor and a second resistor being connected between the gate and the source of the third transistor, a third resistor connected between the second resistor and the drain of the second transistor, a third capacitor connected between the sources of the second and third transistors to provide a first output voltage on one terminal of the third capacitor and a second output voltage on the other terminal of the third capacitor.

2. The power converter according to claim 1, wherein the derivating net is arranged to cause the second transistor to conduct during the rising edge of the transformer voltage.

3. The power converter according to claim 1, wherein the rectifying element is a diode connected by its cathode to the positive end of the secondary winding.

4. The power converter according to claim 3 wherein the derivating net comprises a first capacitor connected between the positive end of the secondary winding and the gate of the second transistor and a first resistor connected between the gate of the second transistor and the negative end of the secondary winding.

5. The power converter according to claim 1, further comprising offset compensating circuitry for removing an offset of the second voltage output.

6. The power converter claim 5, wherein the offset compensating circuitry comprises a first bipolar transistor, the base of the fourth transistor being connected to the first output voltage, the emitter of the fourth transistor being connected to the second output voltage through a fourth resistor and the collector of the fourth transistor being connected to ground through a fifth resistor, a reference ground level being provided on the collector of the fourth transistor.

7. The power converter according claim 1, wherein the offset compensation circuitry comprises a differential amplifier, the non-inverting input of the differential amplifier connected through a sixth resistor to the second voltage output and through a seventh resistor to ground, the inverting input of the differential amplifier connected to the first voltage output through a ninth resistor and an eighth resistor being connected from the inverting input to the output of the differential amplifier U1, the output of the differential amplifier U1 providing the reference ground voltage UffGNDRef.

8. The power converter according to claim 1, wherein a Zener diode is arranged between the gate and the source of the second transistor to increase the input voltage range that can be handled by the second transistor.

9. The power converter according to claim 1, wherein a Zener diode is arranged between the gate and the source of the third transistor to increase the input voltage range that can be handled by the third transistor.

* * * * *

UNITED STATES PATENT AND TRADEMARK OFFICE
CERTIFICATE OF CORRECTION

| | |
|---|---|
| PATENT NO. | : 8,300,432 B2 |
| APPLICATION NO. | : 12/997022 |
| DATED | : October 30, 2012 |
| INVENTOR(S) | : Appelberg |

Page 1 of 1

It is certified that error appears in the above-identified patent and that said Letters Patent is hereby corrected as shown below:

In Column 8, Line 30, in Claim 6, delete "power converter" and insert
    -- power converter according to --, therefor.

Signed and Sealed this
Fifth Day of February, 2013

Teresa Stanek Rea
*Acting Director of the United States Patent and Trademark Office*